(12) United States Patent
Krieter

(10) Patent No.: US 7,898,708 B2
(45) Date of Patent: Mar. 1, 2011

(54) SYSTEM AND METHOD FOR VOLUMETRIC DISPLAY USING A SPINNING MIRROR AND AN ORTHOGONALLY DEFLECTED LINEAR PICTURE ELEMENT SOURCE

(76) Inventor: Marcus Krieter, Newport Beach, CA (US)

( * ) Notice: Subject to any disclaimer, the term of this patent is extended or adjusted under 35 U.S.C. 154(b) by 177 days.

(21) Appl. No.: 12/261,531

(22) Filed: Oct. 30, 2008

(65) Prior Publication Data

US 2010/0114375 A1 May 6, 2010

Related U.S. Application Data

(60) Provisional application No. 60/983,861, filed on Oct. 30, 2007.

(51) Int. Cl.
*G02B 26/08* (2006.01)
(52) U.S. Cl. .................................. 359/201.2; 359/202.1
(58) Field of Classification Search .... 359/201.1–203.1
See application file for complete search history.

(56) References Cited

U.S. PATENT DOCUMENTS 5,555,125 A * 9/1996 Peng ........................ 359/203.1
6,587,597 B1 * 7/2003 Nakao et al. ................ 382/284

* cited by examiner

*Primary Examiner*—James Phan

(57) ABSTRACT

A system and method for creating a three-dimensional ("3D") volumetric display using a linear array of active point light sources and projecting those points on a mirrored surface. The linear image is then modulated and swept along that mirrored surface to create a two-dimensional ("2D") raster image. Simultaneously, the mirrored surface upon which the raster image is created is rotated along a axis that is orthogonal to the raster image. During the orthogonal rotation the 2D raster image is redrawn as separate frames in a timed and coordinated manner such that each pixel element ("pixel") of the 2D image is displayed sequentially in 3D space as a volumetric pixel element ("voxel"). The integrating characteristics of human sight are then used to create the impression of a volumetric surface from the integration of the raster images.

1 Claim, 10 Drawing Sheets

SYSTEM AND METHOD FOR VOLUMETRIC DISPLAY USING A SPINNING MIRROR AND AN ORTHOGONALLY DEFLECTED LINEAR PICTURE ELEMENT SOURCE

CROSS-REFERENCE TO RELATED APPLICATION

This non-provisional United States (U.S.) patent application claims the benefit of 35 U.S.C. §119 and Provisional Patent Application No. 60/983,861 entitled filed on Oct. 30, 2007, which is hereby expressly incorporated by reference herein.

FIELD OF INVENTION

The present invention relates to the field of electrical image creation and display. More specifically, the invention relates to the technical field of three-dimensional translation and volumetric display.

BACKGROUND OF THE INVENTION

In recent years people have adjusted to viewing representations of the real world through images and text on a two-dimensional screen. Technology continues to develop at lightening speed in order to better generate this fictitious two-dimensional world. Although the mechanics of a two-dimensional screen are simpler, it is well known that a three-dimensional display can be more accurate, more pleasing to the eye, more recognized by the human brain and provide a myriad of options that are not possible with traditional screens. Therefore, it is one object of the present disclosure to provide for a system that facilitates display of a three-dimensional image.

SUMMARY OF THE INVENTION

A system and method for creating a three-dimensional ("3D") volumetric display using a linear array of active point light sources and projecting those points on a mirrored surface. The linear image is then modulated and swept along that mirrored surface to create a two-dimensional ("2D") raster image. Simultaneously, the mirrored surface upon which the raster image is created is rotated along an axis that is orthogonal to the raster image. During this orthogonal rotation the 2D raster image is redrawn as separate frames in a timed and coordinated manner such that each pixel element ("pixel") of the 2D image is displayed sequentially in 3D space as a volumetric pixel element ("voxel"). The integrating characteristics of human sight are then used to create the impression of a volumetric surface from the integration of the raster images.

These and other objectives of the claimed invention will no doubt become obvious to those of ordinary skill in the art after reading the following detailed description of the preferred embodiments that is illustrated in the various figures and drawings.

BRIEF DESCRIPTION OF THE DRAWINGS

The preferred embodiments of the invention will hereinafter be described in conjunction with the appended drawings provided to illustrated and not to limit the invention, wherein like designations denote like elements, and in which.

DETAILED DESCRIPTION

In the following detailed description of the various embodiments of the invention, reference is made to the accompanying drawings which form a part of thereof and in which is shown by way of illustration various embodiments in which invention may be practiced. Numerous specific details are set forth in order to provide a thorough understanding of the embodiments of the invention. However, it will be obvious to one skilled in the art that the embodiments of the invention may be practiced without these specific details. In other instances well known methods, procedures, components, and circuits have not been described in detail so as not to unnecessarily obscure aspects of the embodiments of the invention.

Furthermore, it will be clear that the invention is not limited to theses embodiments only. Numerous modifications, changes, variations, substitutions and equivalents will be apparent to those skilled in the art without parting from the spirit and scope of the invention.

Mechanics

Figure 1:
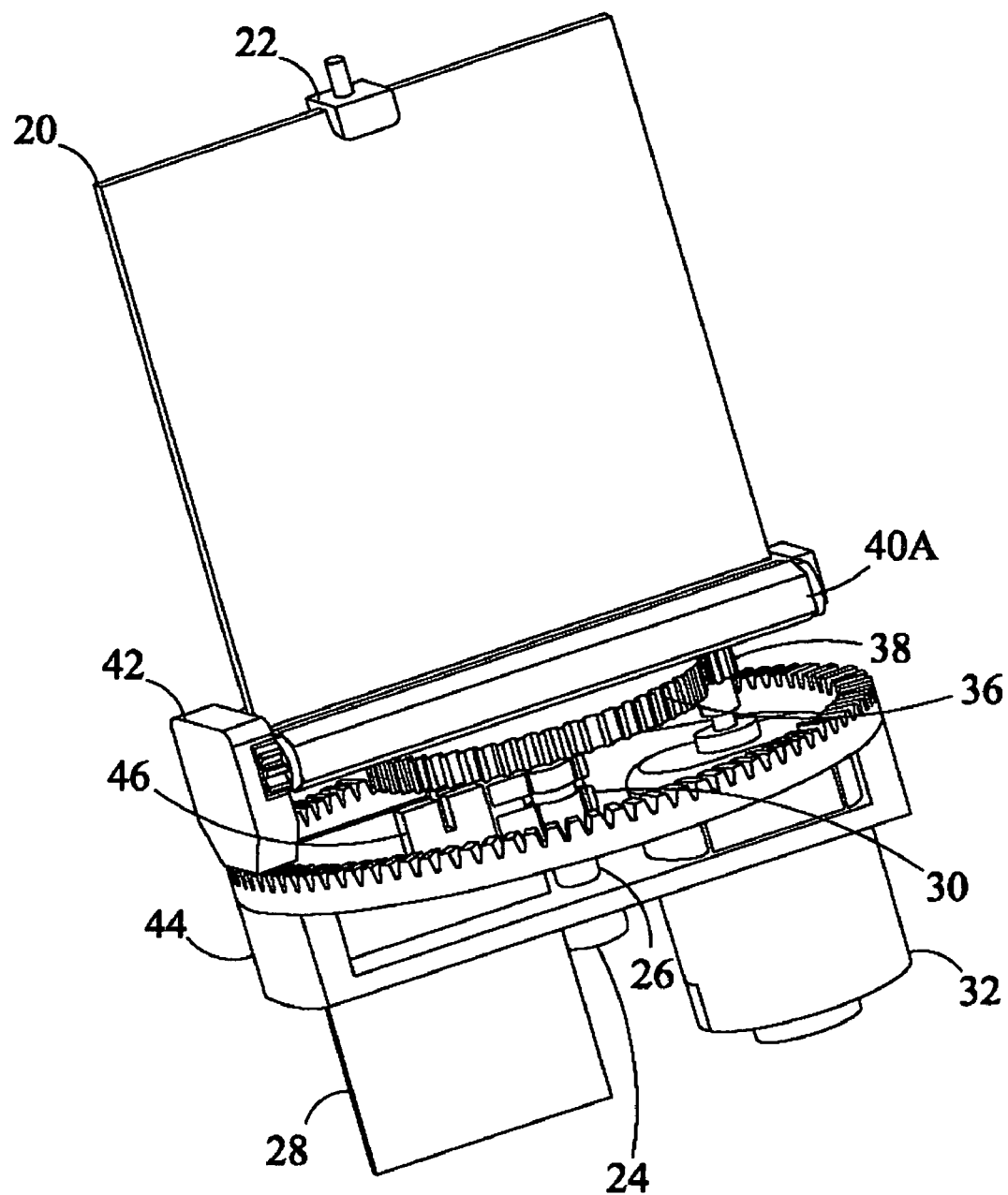
FIG. 1 is a side view, in accordance with an embodiment of the present invention.

FIG. 1 is a side view, in accordance with an embodiment of the present invention. FIG. 1 shows the preferred embodiment of the invention. A double sided mirror 20 is finished to provide a diffusely reflective surface. The mirror spins around its vertical axis being secured by bearings 22 and 24. A mirror assembly shaft 26 rotates within the bottom bearing. The top bearing is secured to the housing (not shown for clarity). The shaft is electrically connected to main circuit board 28 by way of commutators 30.

Figure 2:
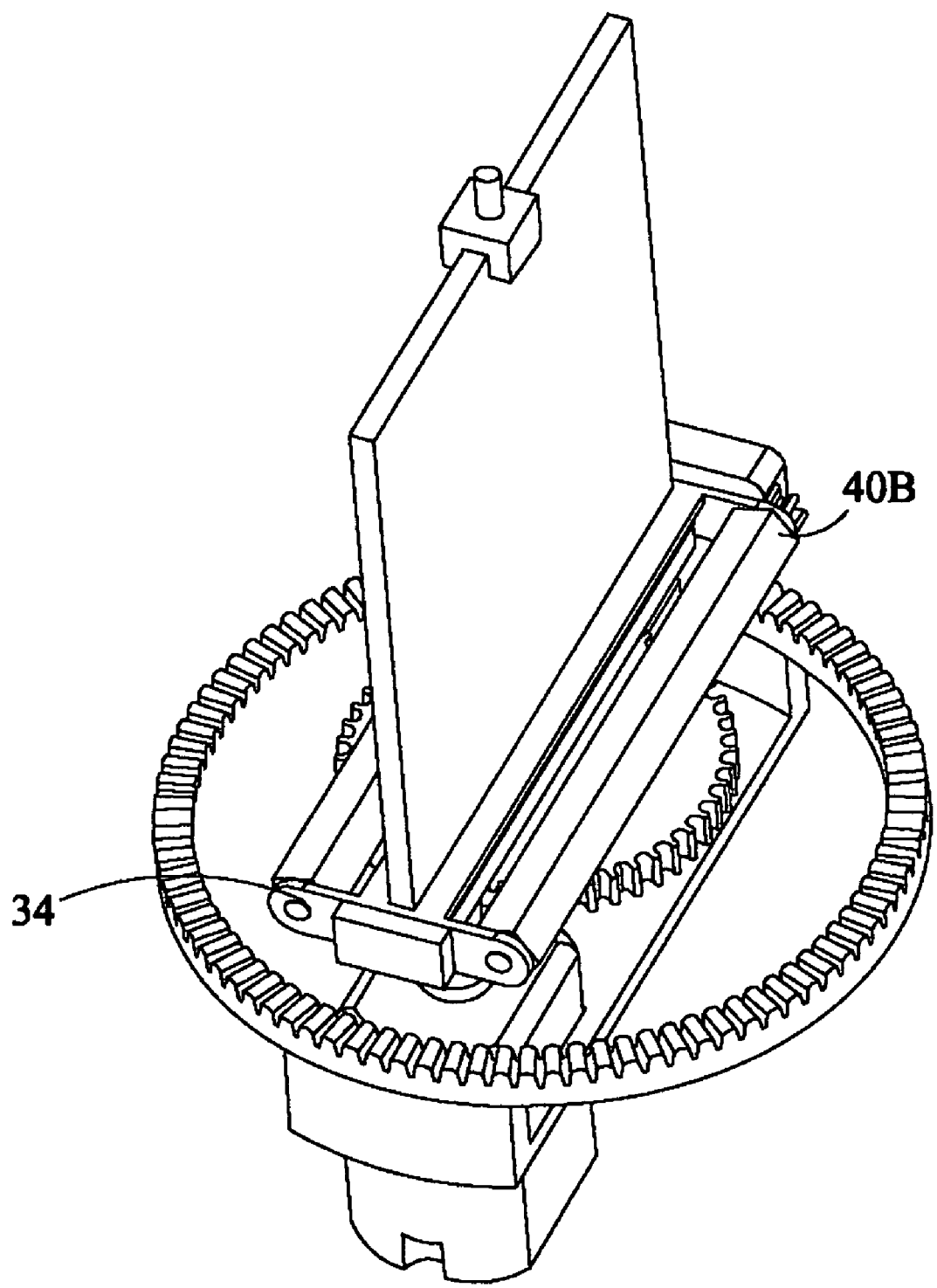
FIG. 2 is a top angled view of the embodiment shown in FIG. 1.
Figure 3:
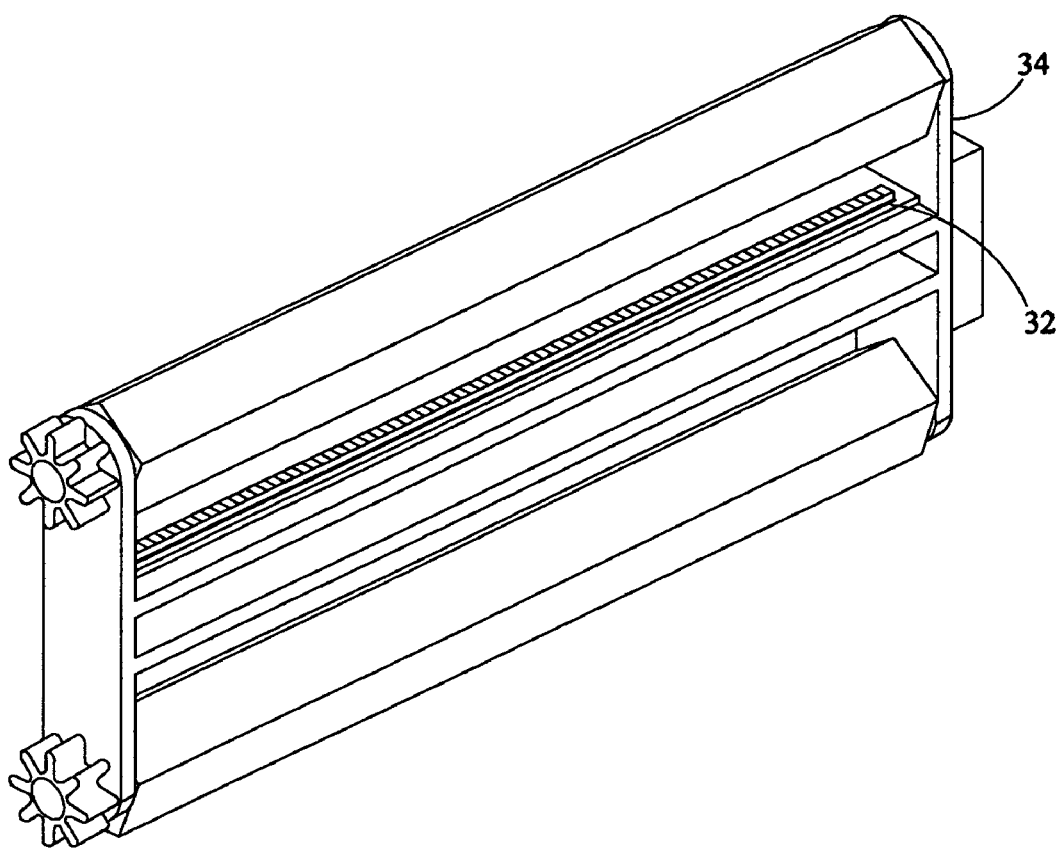
FIG. 3 is a magnified view of the mirrored frame and LED array of the embodiment shown in FIGS. 1 and 2.

FIG. 3 is a magnified view of the mirrored frame and LED array of the embodiment shown in FIGS. 1 and 2. The shaft is electrically connected to a linear LED array 32 and another array on the opposite side of a mirror frame 34 as shown in FIG. 3. The mirror frame is bonded with the main gear and shaft to form a single unit that uses a counter weight 34B for rotational balance. A motor 33 spins the mirror and the rest of its assembly by driving assembly gear 36 via motor gear 38 that is connected to the motor's shaft. The assembly gear is secured to the motor assembly shaft to the transfer motion. When the mirror assembly is spun about its axis image deflection devices 40A and 40B shown in FIGS. 1 and 2 are rotated by a gearbox 42. The gearbox works against a stationary frame 44 that also secures the motor, bottom bearing and main circuit board. The top of this frame is a gear track that drives the gearbox and hence the deflection devices when the top assembly is rotated with respect to it. For timing an optical sensor 46 senses the crossing of the mirror assembly at a consistent point for each revolution of the main mirror assembly. The trip for the sensor is a tab molded into the main gear assembly driving the mirror assembly.

Alternate embodiments for drive and connection of the main board 28 and LED arrays 32 and 34 include using commutators for power on, and transmitting data to the LED board wirelessly using either radio frequency such as wireless USB or through an optical connection. Additionally, even the commutator connections for power can be eliminated by wirelessly transmitting power to the LED arrays using inductive conduction. The mechanical gear connection can be eliminated by using other pulley or chain mechanisms. It can also be accomplished by using magnetic coupling. This coupling can use permanent magnets an electromagnet including a stator-armature method or other coupling methods known in the art. Additionally, the double sided mirror can also be replaced by a single sided one. The deflection devices can also be driven by a separate motor or motors that would revolve with the mirror assembly.

Figure 4:
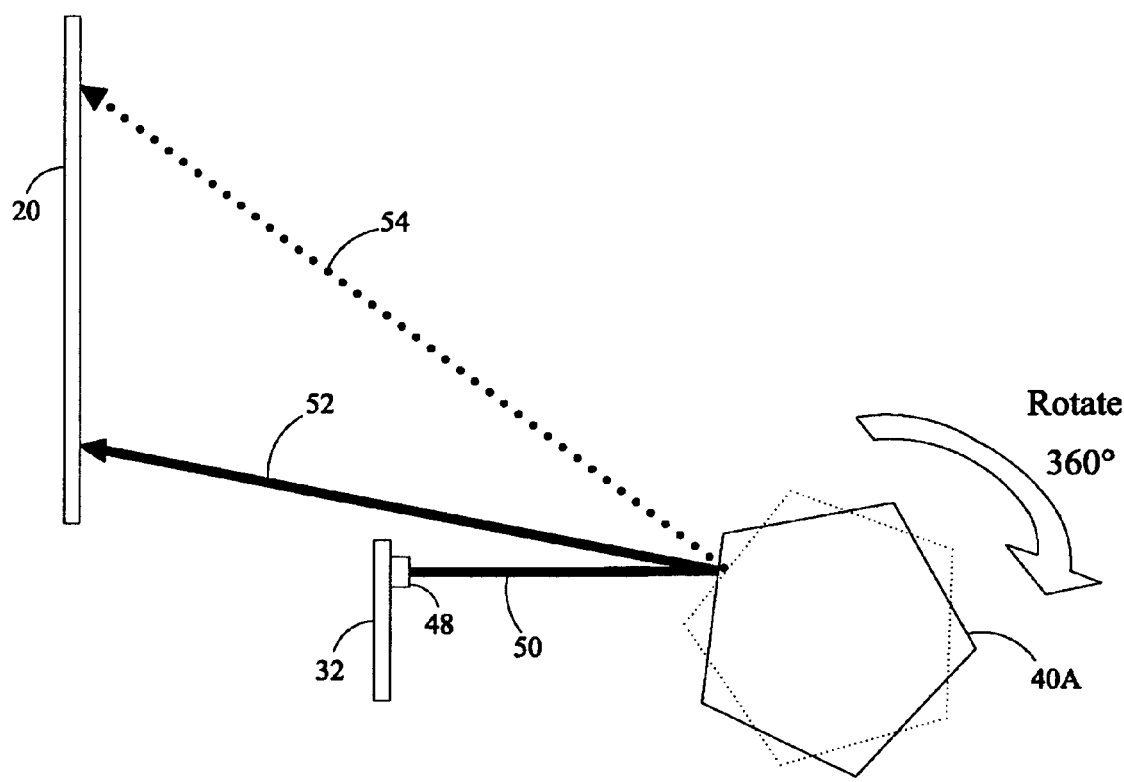
FIG. 4 is a schematic for the deflection device operating against the mirror, in accordance with an embodiment of the present invention.

FIG. 4 is a schematic for the deflection device operating against the mirror, in accordance with an embodiment of the present invention. FIG. 4 shows a schematic for the deflection device 40A operating against the mirror. As the deflection device rotates a linear pattern is multiplexed on the LED array 32 comprised of a line of LEDs 48. The LEDs have lenses that focus their light on the deflection device. The deflection device in this embodiment is optionally smooth. Rays cast from the LED array 50 are incident on the deflection device. As it is rotated the incident ray is reflected onto the mirror. Ray 52 is reflected as a sharp angle and is focused on the bottom of the mirror. As the deflection device is further rotated ray 54 is formed and focused further toward the top of the mirror.

Alternate embodiments for the deflection device 40A include curved surface on the device to compensate for differences in focus of the reflected beam. Also, more or fewer surfaces can be used including a single sided flat mirror geometries having numbers of surfaces greater than a hexagon.

Figure 5:
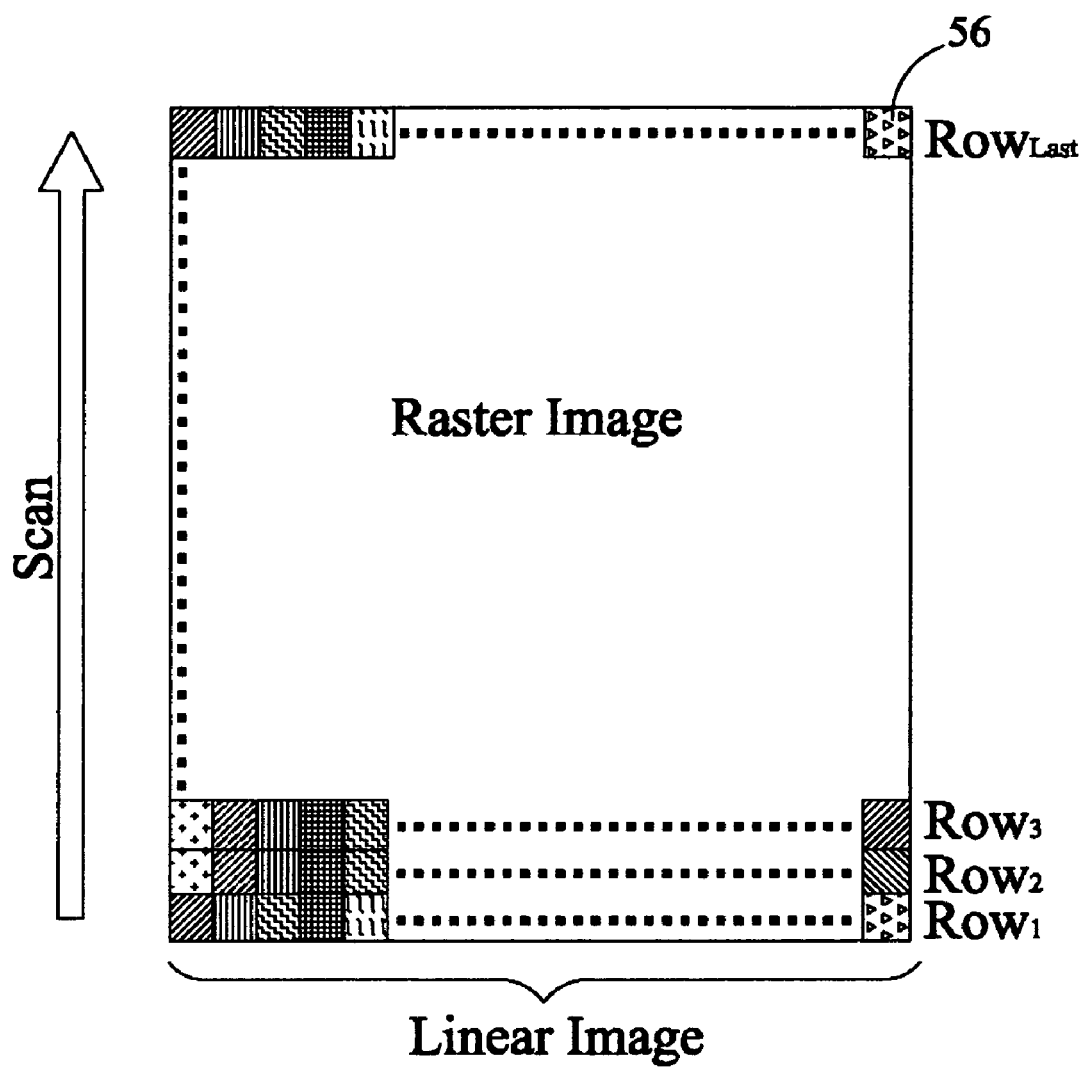
FIG. 5 is a raster image that forms on the mirror, in accordance with an embodiment of the present invention.

FIG. 5 is a raster image that forms on the mirror, in accordance with an embodiment of the present invention. FIG. 5 shows a raster image that is formed on the surface of the mirror. The linear LED arrays cast an entire row across the mirror. Each pixel 56, on this image is scanned by the deflection device in a vertical manner to complete an entire 2-dimensional image. While each image is displayed, the mirror rotates partially, through its path of 360 degrees.

Figure 6:
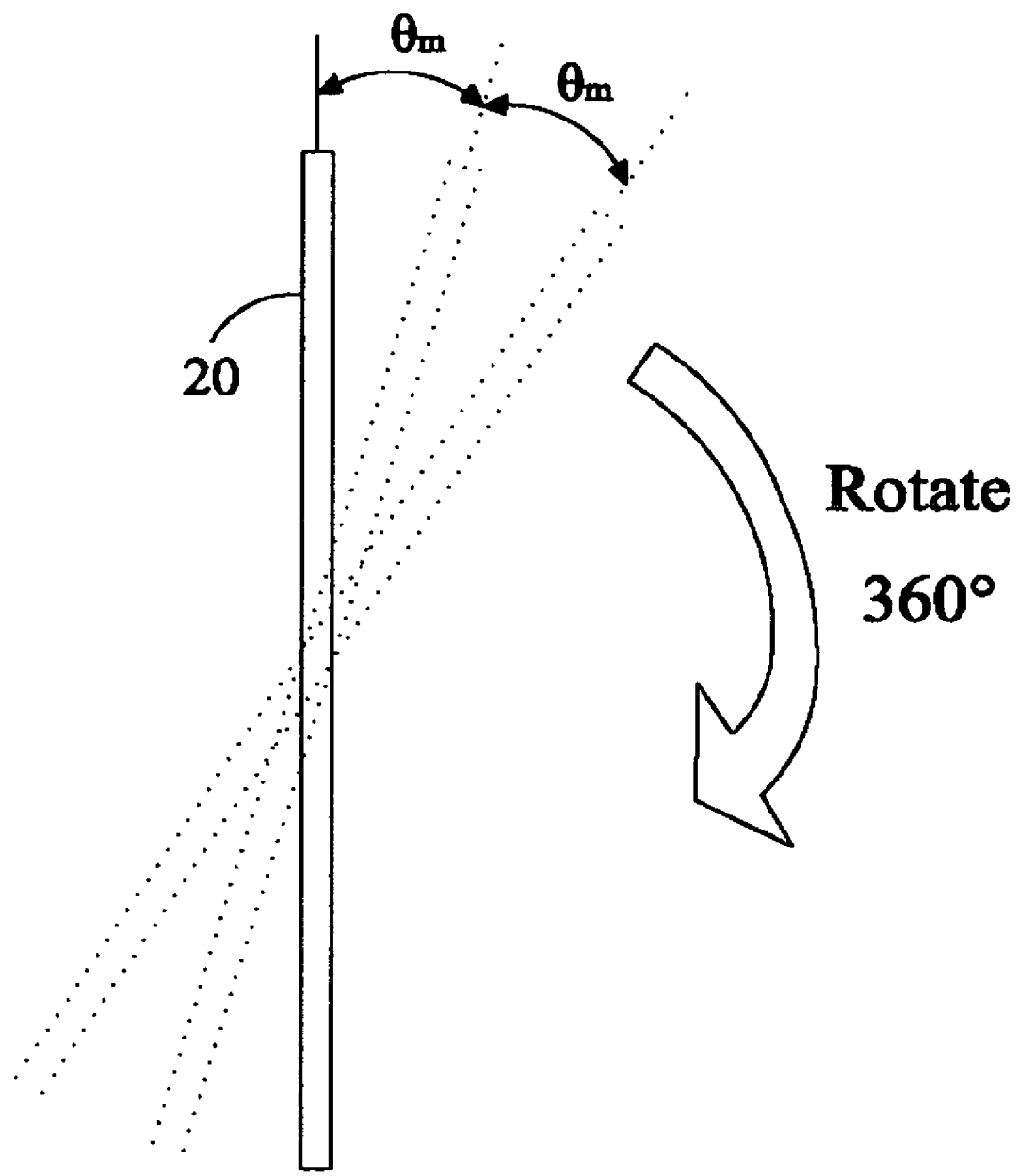
FIG. 6 illustrates the formation of frames through the rotation of the mirror, in accordance with an embodiment of the present invention.

FIG. 6 illustrates the formation of frames through the rotation of the mirror, in accordance with an embodiment of the present invention. Within a fraction of the rotation $\theta_m$ one frame is finished and another is started as shown in FIG. 6.

Figure 7:
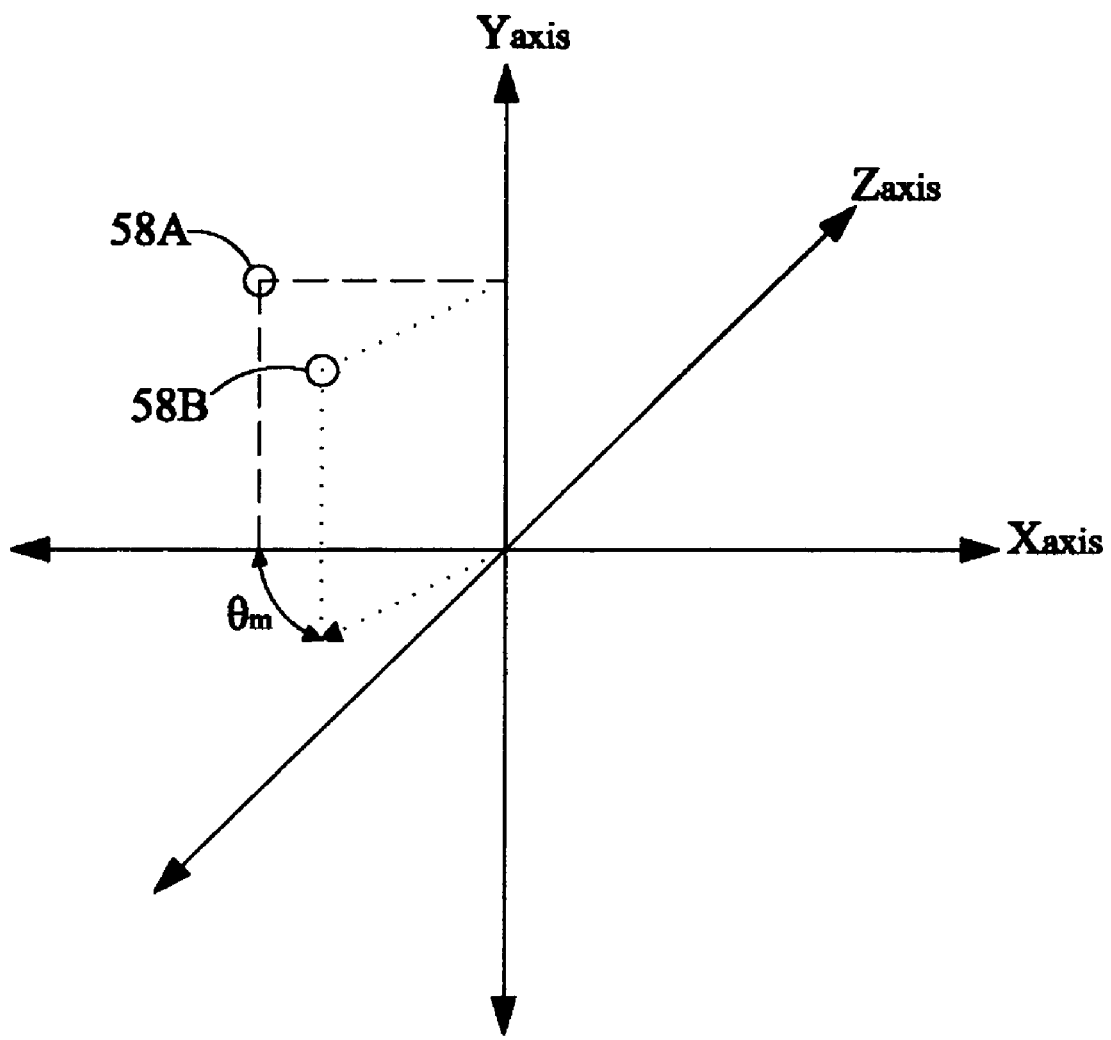
FIG. 7 illustrates the translation of pixels into a 3D image in Cartesian coordinates, in accordance with an embodiment of the present invention.

FIG. 7 illustrates the translation of pixels into a 3D image in Cartesian coordinates, in accordance with an embodiment of the present invention. Pixels 58A and 58B get translated into a 3-dimensional presence. The mirror rotates through the Z-X axis and the deflection device produces the Y-axis offset.

Figure 8:
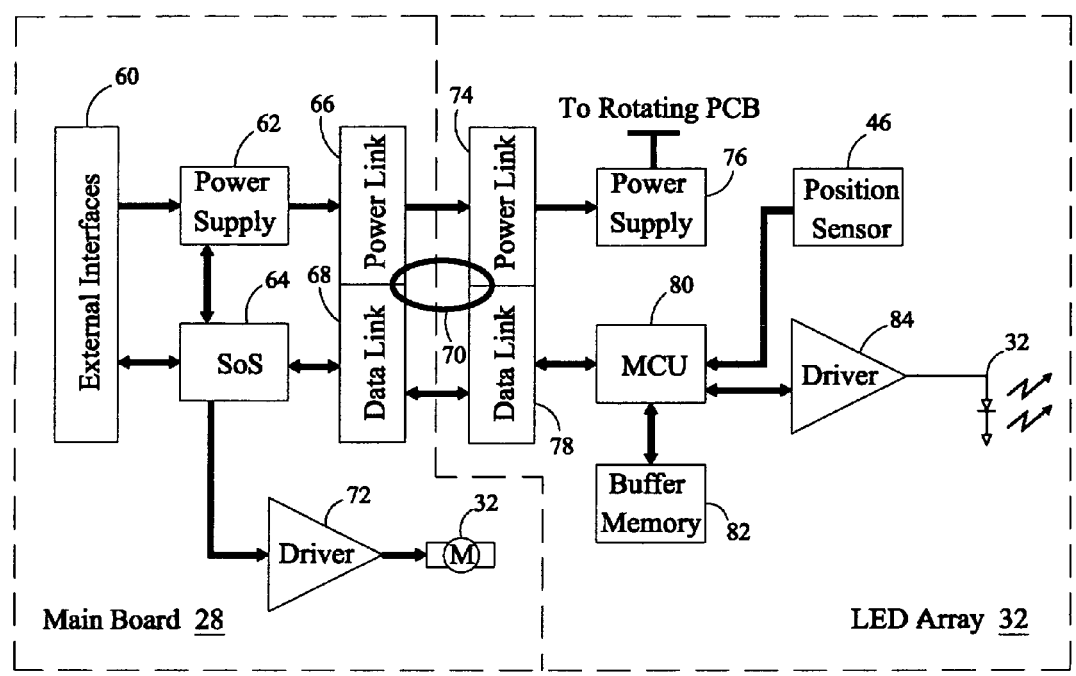
FIG. 8 illustrates a simplified architecture for the drive electronics of the embodiment shown in FIG. 1.

FIG. 8 shows a simplified architecture for the drive electronics in accordance with an embodiment of the present invention. External human interfaces 60 such as power or battery input, switch input, sensor input, audio data and USB connections are connected respectively to the main board power supply 62 and the system on silicon ("SOS") 64. Outputs from both of these are then connected by a power transfer means 66 and data link means 68 to the LED array that spins on the mirror assembly with the mirror. The data link 68 transfers image and control data to the LED arrays. Data link method 70 transfers both power and data between the main board and LED arrays. The motor is controlled by the system on silicon by means of a driver 72. This driver controls speed and startup of the motor. On the LED arrays a power receiving means 74 receives the transmitted power required to drive the arrays and controls and distributes that power using array power supply 76. A data connection means 78 routes data and commands through MCU 80 and its resources including image buffer memory 82. The MCU drives the LED array using an array of drives 84. Each LED in the array is driven individually. Only one driver and LED are shown for clarity.

Figure 9:
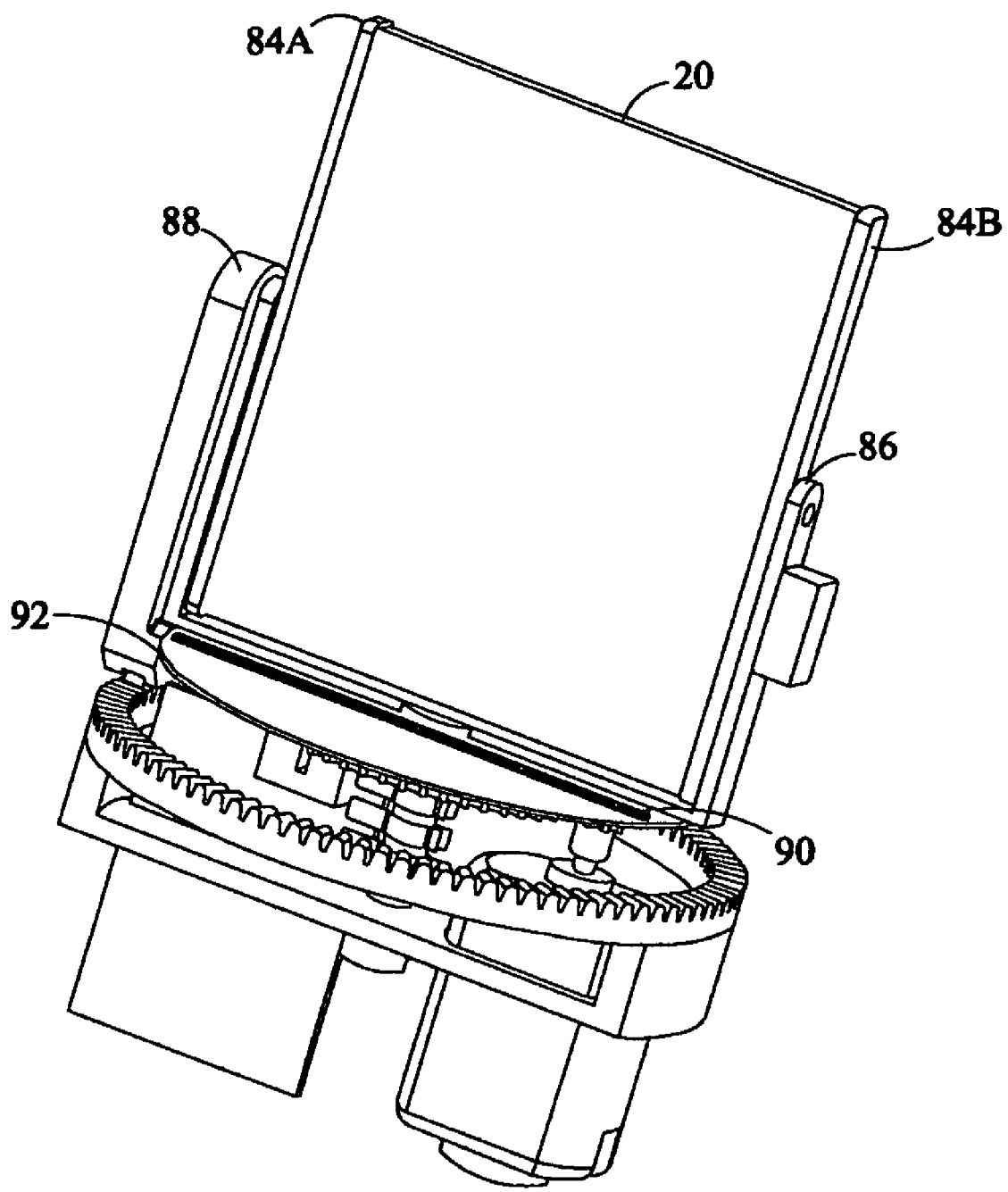
FIG. 9 illustrates an alternate embodiment of the present invention.
Figure 10:
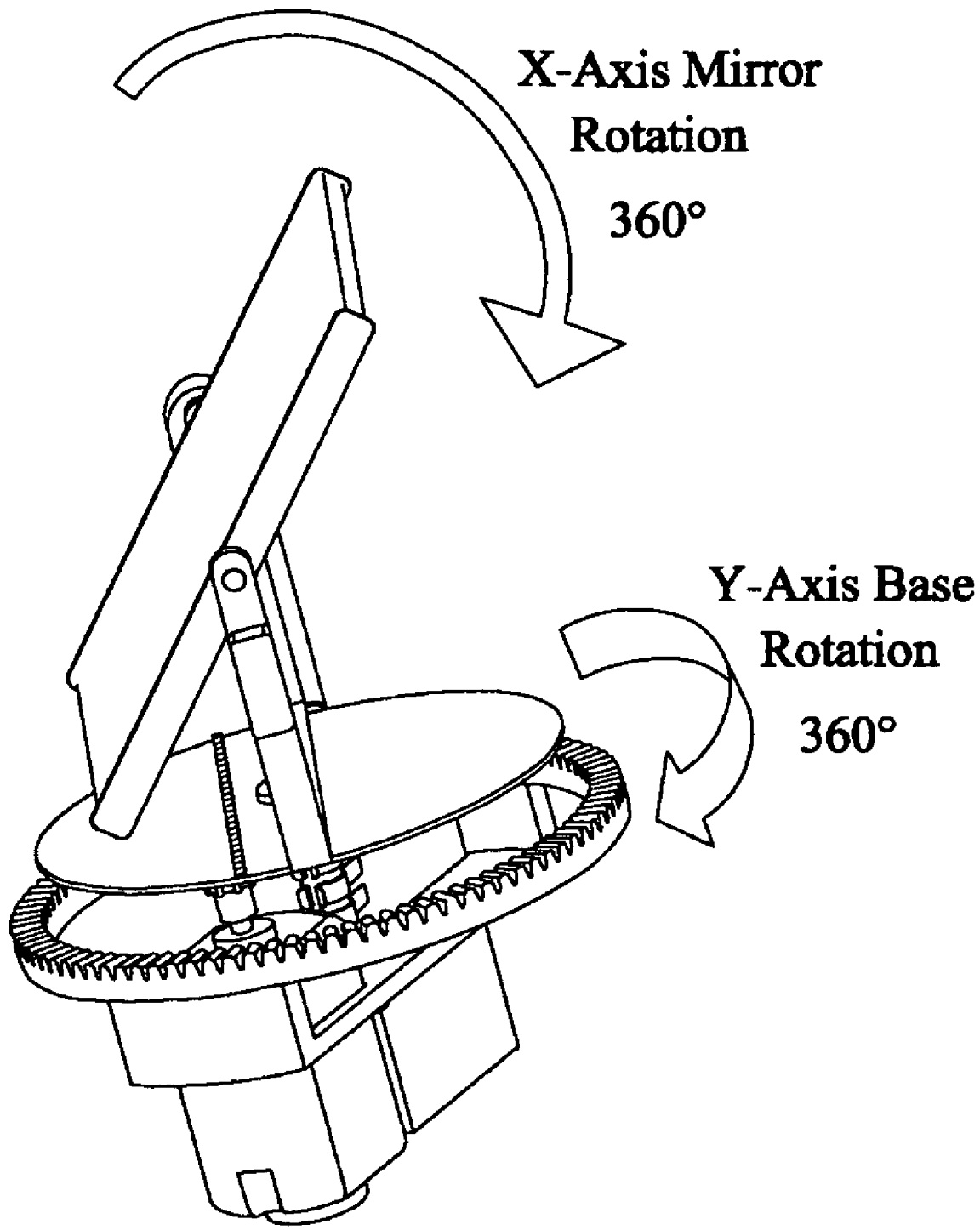
FIG. 10 illustrates rotation of a mirrored frame about X and Y axis, in accordance with the embodiment of FIG. 9.

FIG. 9 shows an alternate embodiment for the invention. It is substantially the same with the exception of the following noted features. FIG. 10 illustrates rotation of a mirrored frame about X and Y axis, in accordance with the embodiment of FIG. 9. The mirror in this embodiment is held by frames 84A and 84B in a gimbaled frame 86 that rotates about the Y-axis as shown in FIG. 10. Simultaneously, the mirror is rotated in the orthogonal X-axis as also shown in FIG. 10 by a gearbox 88 that acts against system's stationary frame. This orthogonal rotation causes the linear array of LEDs 90 located on the LED array circuit board 92 to create a raster image on the mirror equivalent to FIG. 5. Then when rotated in the Y-axis image frames are translated into a volume display in an equivalent transform to that shown in FIG. 7.

Operation

This invention relies on the integration and depth perception characteristics of natural human sight to provide the perception of a 3D object in a defined space. In the preferred embodiment a volume display is generated by use of the deflection devices 40A and 40B to create a raster image made of individual pixels 56 combined in 2D matrix as shown in FIG. 5. There are two such deflection devices because the mirror is double sided; there is one on each side. The deflection devices are held orthogonally with respect to each of the mirrors on which they project by the frame section 34 and its associated components bonded to it including the counter weight 34B, the main gear 36, the bottom commutator shaft 26 and the main mirror 20 that is bonded in the slot between two the deflection devices in FIG. 3. The gears at one end of the deflection devices shown directly drive the axial shafts on their respective deflection devices. These gears maintain a fixed relative rotational position with respect to each other and their drive at all times. The counter weight provides balance to reduce vibration when the frame and its bonded components are spun. Although not necessary a double sided mirror 20 is preferred over a single sided one as that will cut in half the number of rotations about the Y-axis required to display a volume.

In this preferred embodiment the frame 44 remains stationary with respect to the rotating mirror assembly. The frame also holds the motor 33, bottom bearing 24 and main PCB 28, stationary with respect to the mirror assembly. In a final product configuration, this frame would also be made stationary with respect to the product housing or its features may be made as an integral part of the housing. The bearing shaft 22 would also be accommodated with a receptacle in the product housing to help stabilized the mirror assembly when rotating. The motor supplies the force to drive the Y-axis rotation as it is coupled by the motor shaft gear 38 to the main assembly gear 36. Using the gear teeth on the frame, the gearbox 42 translates the mirror assembly's motion into rotation of the deflection devices orthogonal to the mirrors. The speed of this rotation depends on the number of voxels that need to be displayed in 3D. For illustration, if the LED array is comprised of 96 LEDs in the X-axis and the 2D raster image is square in the Y-axis, the 2D image would be a 96 by 96 pixel raster image. In this case FIG. 5 would have a linear image created by 96 point sources and there would be 96 rows multiplexed onto the mirror by each deflection device projecting on its respective mirror. When the mirror assembly is driven by the motor, it spins on the Y-axis as shown in FIG. 6. A complete 2D image is formed within the angular displacement $\theta_m$ translating this into 3D space according to the Cartesian transform in FIG. 7. In FIG. 7, only two voxels 58A and 58B are shown. In an actual image, naturally, a full surface would be defined by a large number of voxels. The number of voxels is determined by the rotational speed of the deflection device surface with respect to the speed of the mirror assembly's rotation. Using a dual mirror producing 15 images per second, a net 7.5 revolutions per second of the mirror assembly is required. 15 images per second is at the threshold speed of where visual integration will begin to be lost, causing flickering, if any slower rate is used. If voxels are to be able to be displayed in space at 96 angular displacements per 360° of viewing angle in the Y-axis then the displacement devices must rotate at $(7.5_{rps}*96_{fpr})/N_{dd}$, where $N_{dd}$ is the number of reflective surfaces presented by the deflection device in one of its rotations of 360°, $7.5_{rps}$ is the example angular velocity in revolutions per second of the main mirror assembly and $96_{fpr}$ is the number of 2D image frames per revolution per one revolution of the main mirror. For reference at 96 fpr, $\theta_m=360°/96$ or 3.75°. Schematically, FIG. 4 shows this for one side of the mirror assembly. The reflective surface of the deflection device is specular to provide a narrow focus onto the main mirror. The main mirror is diffusely reflective to help improve the viewing angle for the user. A pentagonal structure is used for illustration of the deflection device. Hence, 5 raster images are projected on the main mirror for each complete revolution of the deflection device. The actual mechanical rotation for each deflection device is provided by gearbox 42. Based on a pentagonal deflection device and 96 2D images per revolution of the main mirror, the required gearing ratio for this example would be 96/5:1. Any number of deflection devices surfaces per rotation form one surface to more than 10 is feasible. The LED array 32 is comprised, for this embodiment, of a line of 96 LEDs 48. The LED lenses and the surfaces of the deflection device are optimized to provide proper focus on the main mirror after reflection off the respective deflection device. Through each rotation of the pentagon, 5 surfaces are presented for reflection. The incident rays are projected onto the presented surface of the deflection device along the projected path 50. Depending on the angular position of the reflecting surface of the deflection device, the incident ray is deflected based on the taws of reflection onto the main mirror. Based on the angular direction shown, the ray 52 is projected on the portion of the main mirror that is closest to the respective deflection device. After the deflection device has rotated along the angular axis shown the ray 54 is deflected towards the opposite end of the main mirror. Deflection devices do not have to be rotating to create the deflection angle. They can be any other of variable reflective or refractive surface that is timed with the rotation of the main mirror assembly. This includes solid stated devices driven by piezoelectric, other acoustic wave devices or electromagnetic drives such as a linear motor or voice coil θ pixel reflection using a rotating deflection device will have a constant velocity across the main mirror. An oscillating deflection will have a varying velocity depending on the driving waveform. In most cases, this would be a sinusoid or portion thereof. Thus changes in velocity would need to be compensated either through a non planar surface on the deflection device's reflecting surface or by varying the duration of projection of each row of pixels in each frame. Additionally, the deflection device can be driven by an independent drive such as another motor or oscillating driver. Since the gear driven mechanism of the deflection devices in this embodiment is deterministic with respect to the main mirror's rotational displacement only one timing reference measured by optical sensor 46 needs to be used. The reference is derived from passing a tab that is secured to the main assembly gear through an optical sensor 46. In the case where an unsynchronized deflection device drive is used, a separate timing reference that is relative to the deflection device's position with respect to the main mirror would be needed.

The shaft 26 of the drive mechanism also provides a mechanism for this embodiment to establish communication between the main PCB and the LED array via the 3-contact isolated commutator 30. The LED array 32 is comprised of a PCB itself onto which the LEDs are mounted. As shown in FIG. 8 both boards are controlled by complex logical functions. On the LED array, a microcontroller unit 80 interacts with a SOS device 64 to establish a reliable communication channel for transfer of voxel data from the main board to the LED array. This data is transferred in simple compressed format such as run length limited format to reduce bandwidth and ensure bit recovery. Because of the inherent noise of commutators error checking and retransmit are facilitated over the single data contact referenced to power ground as well. Alternate communication methods such as cortical linkage or RF linkage can be used and would require the data link comprised of link 68 on the main board and 78 on the LED array to be changed accordingly. Two of the three commutators would transfer power and common ground according using link 66 on the main board and 74 on the LED array. Because of the inherent noise in such mechanical connections the power supply on each side of the system link 70 would need appropriate filtering to insure a delivery of a stable form to the resources on each board. The power supply 62 would be under control of the main system on silicon and would support power management to save energy. The power support 76 on the LED array would be a slave to this supply. Other methods such as inductive coupling can be used but would require a more sophisticated, smart power supply arrangement on both sides of the link. Regardless of the embodiment, the system link 70 passing both power and data is established using connections that support the independent rotation of the LED assemblies that are attached to the mirror and deflection device frame. The system on silicon has an internal processor and memory that not only facilitates the communication link with the LED array but also performs system functions including power control via the power supply 62 and user interface via user interfaces 60 as required by the user application. For example, not only could simple displays be created, higher level functions such as gaming and communication with other devices can be facilitated. The motor 33 is controlled by a simple power driver 72. Because of the timing reference provided by the gear position sensor 46 proportional control of the motor is required. To facilitate reliable communications between the LED array and main board, the buffer memory 82 is used to preload images and decompress images at a rate faster than the display of those images. This allows overhead for retransmissions and for synchronization with the position sensors trigger point. The LED array 32 is modulated by an array of drivers 84. Each LED in the array is driven by an independent driver. In this embodiment the display is monochrome. Brightness is adjusted by pulse width modulation of the drive waveform by the driver under control of the MCU. An alternate embodiment could use a simple on or off switch if grayscale is not needed. Conversely, if color was required separate channels per pixel made up of red, green and blue LEDs could be driven with independent pulse width driver to form a full color raster image.

FIG. 9 and FIG. 10 show an alternate system embodiment that does not use deflection devices. Other than the features enumerated in FIG. 9 and illustrated in FIG. 10, the system is the same as the latter. In place of the deflection devices, the 2D raster image projected on each side of the main mirror is created by rotating the entire mirror through 360° in the X-axis with respect to a single row of LEDs 90 that are mounted on the PCB 92. The PCB is rotated with respect to the Y-axis and is fixed in a parallel orientation with respect to the axis of rotation of the main mirror. The mirror frame is comprised of two segments 84A and 84B that are bonded to opposite edges of the mirror. These segments have two shafts that allow rotation of the mirror in the θ frame 86. The frame is fixed to the PCB. The gearbox 88 rotates the mirror by driving it in the same manner as the deflection device in the preferred embodiment. Based on the 3D display resolution, the gearbox ratio would need to be changed. For the 96x, 96y per 3.75° of rotation at $15_{fps}$ the mirror would need to be rotated in its X-axis 96 time per Y-axis revolution. Because of the double sided mirror the angular velocity would be 7.5 revolutions per second in the Y-axis.

The present invention includes any novel feature or combination of features disclosed herein either explicitly or any generalization thereof. While the invention has been described with respect to specific examples including presently preferred modes of carrying out the invention those skilled in the art will appreciate that there are numerous variations and permutations of the above described apparatus and techniques. Thus, the spirit and scope of the invention should be construed broadly as set forth in the appended claims.

While the principles of the disclosure have been illustrated in relation to the exemplary embodiments shown herein, the principles of the disclosure are not limited thereto and include any modification, variation or permutation thereof.

What is claimed is:

1. A system for generating a three-dimensional presence from a two-dimensional raster image comprising:
    at least one LED array to generate said image;
    at least one deflector within a visual path of said at least one array;
    a double sided mirror, said mirror forming an angle between said at least one deflector and said array, and held by a frame that is mechanically connected to a plurality of gears, said gears being mechanically connected to a gearbox and said gearbox controlled by a motor wherein the speed and power of said motor is computationally controlled; and
said image translated into said three-dimensional presence through the spinning of said mirror.

* * * * *